(12) United States Patent
Sevenich et al.

(10) Patent No.: US 10,831,829 B2
(45) Date of Patent: Nov. 10, 2020

(54) FAST DETECTION OF VERTEX-CONNECTIVITY WITH DISTANCE CONSTRAINT

(71) Applicant: Oracle International Corporation, Redwood Shores, CA (US)

(72) Inventors: Martin Sevenich, Palo Alto, CA (US); Sungpack Hong, Palo Alto, CA (US); Alexander Weld, Mountain View, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 168 days.

(21) Appl. No.: 16/185,236

(22) Filed: Nov. 9, 2018

(65) Prior Publication Data
US 2020/0151216 A1  May 14, 2020

(51) Int. Cl.
*G06F 16/00* (2019.01)
*G06F 16/901* (2019.01)
*G06F 16/9532* (2019.01)
*G06F 16/22* (2019.01)

(52) U.S. Cl.
CPC ...... *G06F 16/9024* (2019.01); *G06F 16/2219* (2019.01); *G06F 16/9532* (2019.01)

(58) Field of Classification Search
CPC ............. G06F 16/9024; G06F 16/2219; G06F 16/9532
See application file for complete search history.

(56) References Cited

U.S. PATENT DOCUMENTS

2018/0365019 A1* 12/2018 Rossi .................. G06F 16/2471
2019/0179752 A1*  6/2019 Yoo ..................... G06F 16/9027

OTHER PUBLICATIONS

Takuya Akiba, Yoichi Iwata, and Yuichi Yoshida, "Fast Exact Shortest-Path Distance Queries on Large Networks by Pruned Landmark Labeling", SIGMOD'13, Jun. 22-27, 2013, ACM, pp. 349-360. (Year: 2013).*

(Continued)

*Primary Examiner* — Cheryl Lewis
(74) *Attorney, Agent, or Firm* — Hickman Palermo Becker Bingham LLP

(57) ABSTRACT

Embodiments perform real-time vertex connectivity checks in graph data representations via a multi-phase search process. This process includes an efficient first search phase using landmark connectivity data that is generated during a preprocessing phase. Landmark connectivity data maps the connectivity of a set of identified landmarks in a graph to other vertices in the graph. Upon determining that the subject vertices are not closely related via landmarks, embodiments implement a second search phase that performs a brute-force search for connectivity, between the subject vertices, among the graph's non-landmark vertices. This brute-force search prevents exploration of cyclical paths by recording the vertices on a currently-explored path in a stack data structure. The second search phase is automatically aborted upon detecting that the non-landmark vertices in the graph are over a threshold density. In this case, embodiments perform a third search phase involving either a modified breadth-first search or modified bidirectional search.

20 Claims, 7 Drawing Sheets

(56) References Cited

OTHER PUBLICATIONS

Oracle, "Big Data Spatial and Graph User's Guide and Reference", dated 2015, 20 pages.
Neofj, "The Neo4j Operations Manual v3.5", dated 2019, 375 pages.
GeeksforGeeks, "Bidirectional Search", https://www.geeksforgeeks.org/bidirectional-search/, dated Feb. 19, 2019, 6 pages.
DSE 5.1 DEV Guide, "About DSE Graph", https://docs.datastax.com/en/dse/5.1/dse-dev/datastax_enterprise/graph/dseGraphAbout.html, dated Feb. 19, 2019, 5 pages.
Databricks, "Graph Analysis Tutorial With GraphFrames", https://docs.databricks.com/spark/latest/graph-analysis/graphframes/graph-analysis-tutorial.html, dated 2018, 15 pages.

\* cited by examiner

FIG. 3A

BITMAP 300

| "FR_1" | W=1 (VERTEX 206) | W=2 (VERTEX 214) | W=3 (VERTEX 216) |
|---|---|---|---|
| 202 | 0 | 0 | 0 |
| 204 | 1 | 0 | 0 |
| 206 | 1 | 1 | 1 |
| 208 | 0 | 0 | 0 |
| 210 | 0 | 0 | 1 |
| 212 | 1 | 0 | 0 |
| 214 | 1 | 1 | 1 |
| 216 | 1 | 1 | 1 |
| 218 | 0 | 0 | 0 |
| 220 | 0 | 1 | 0 |
| 222 | 0 | 0 | 1 |
| 224 | 0 | 0 | 0 |
| 226 | 0 | 0 | 0 |

BITMAP 310

| "BR_1" | W=1 (VERTEX 206) | W=2 (VERTEX 214) | W=3 (VERTEX 216) |
|---|---|---|---|
| 202 | 0 | 0 | 0 |
| 204 | 1 | 0 | 0 |
| 206 | 1 | 1 | 1 |
| 208 | 0 | 0 | 0 |
| 210 | 0 | 0 | 1 |
| 212 | 0 | 1 | 0 |
| 214 | 1 | 1 | 1 |
| 216 | 1 | 1 | 1 |
| 218 | 0 | 0 | 0 |
| 220 | 0 | 1 | 0 |
| 222 | 0 | 0 | 1 |
| 224 | 0 | 0 | 0 |
| 226 | 0 | 0 | 0 |

FIG. 3B

BITMAP 320

| "FR_2" | W=1 (VERTEX 206) | W=2 (VERTEX 214) | W=3 (VERTEX 216) |
|---|---|---|---|
| 202 | 1 | 0 | 0 |
| 204 | 1 | 1 | 1 |
| 206 | 1 | 1 | 1 |
| 208 | 0 | 0 | 1 |
| 210 | 1 | 1 | 1 |
| 212 | 1 | 1 | 1 |
| 214 | 1 | 1 | 1 |
| 216 | 1 | 1 | 1 |
| 218 | 1 | 0 | 0 |
| 220 | 1 | 1 | 1 |
| 222 | 1 | 1 | 1 |
| 224 | 0 | 0 | 1 |
| 226 | 1 | 0 | 0 |

BITMAP 330

| "BR_2" | W=1 (VERTEX 206) | W=2 (VERTEX 214) | W=3 (VERTEX 216) |
|---|---|---|---|
| 202 | 1 | 0 | 0 |
| 204 | 1 | 1 | 1 |
| 206 | 1 | 1 | 1 |
| 208 | 0 | 0 | 1 |
| 210 | 1 | 1 | 1 |
| 212 | 1 | 1 | 1 |
| 214 | 1 | 1 | 1 |
| 216 | 1 | 1 | 1 |
| 218 | 0 | 1 | 0 |
| 220 | 1 | 1 | 1 |
| 222 | 1 | 1 | 1 |
| 224 | 0 | 0 | 1 |
| 226 | 1 | 0 | 0 |

402
RECEIVE, FROM A CLIENT, A REQUEST TO DETERMINE WHETHER A FIRST VERTEX AND A SECOND VERTEX, OF A PARTICULAR GRAPH DATA REPRESENTATION, ARE CONNECTED WITHIN A PARTICULAR NUMBER OF HOPS, WHERE THE PARTICULAR GRAPH DATA REPRESENTATION INCLUDES A PLURALITY OF HIGH-DEGREE VERTICES

404
BASED, AT LEAST IN PART, ON LANDMARK CONNECTIVITY DATA, DETERMINE WHETHER THE FIRST VERTEX AND THE SECOND VERTEX ARE CONNECTED VIA ONE OR MORE HIGH-DEGREE VERTICES, OF THE PLURALITY OF HIGH-DEGREE VERTICES, WITHIN THE PARTICULAR NUMBER OF HOPS, WHERE THE LANDMARK CONNECTIVITY DATA COMPRISES CONNECTIVITY INFORMATION FOR EACH OF THE PLURALITY OF HIGH-DEGREE VERTICES

406
RESPONSIVE TO DETERMINING THAT THE FIRST VERTEX AND THE SECOND VERTEX ARE CONNECTED VIA THE ONE OR MORE HIGH-DEGREE VERTICES, INDICATE, IN A RESPONSE TO THE REQUEST, THAT THE FIRST AND SECOND VERTICES ARE CONNECTED though this example search algorithm shows very
FAST DETECTION OF VERTEX-CONNECTIVITY WITH DISTANCE CONSTRAINT

FIELD OF THE INVENTION

The present invention relates to performing distance-constrained connectivity searches within graph data representations, and, more specifically, to increasing the efficiency of performing such connectivity searches to allow application of the connectivity searches in real-time or near real-time.

BACKGROUND

Particular kinds of data comprises interrelated entities, such as data that models maps, people, businesses, user music preferences, etc. Data that models interrelated entities can be readily represented as a set of interconnected objects in a graph data representation. Graph data representations (or "graphs") model relationships between entities using data structures called edges and vertices, where the data structures may be associated with properties or attributes. Some graphs model inherent spatial relationships, such as networks of roads, telecommunications, water utilities, etc. Different graphs model other kinds of relationships, such as logical connections among entities in the Internet, biological pathways, and social relationships.

Using graph data representations, a variety of machine-driven analytic processes can discover underlying relationships (both explicit and implicit) between represented entities, yielding important insights from the data. For instance, in the field of financial fraud detection, graphs that represent transactions between business entities are used to detect suspicious transactions. In such financial fraud detection applications, as with many other analytic applications, one typical task is to check the connectivity between two vertices in the graph under a distance constraint, such as within a certain number of hops between the vertices. For example, particular financial fraud analysis software is configured to detect, from a graph data representation, whether an entity currently requesting a bank transaction has a close relationship with any other entities known to have committed fraud.

In graph analysis, a bidirectional search algorithm is one common-sense approach to determining whether two vertices have a close relationship within a given graph. The following is an example implementation of bidirectional search that determines whether a "terminating" vertex 'T' is reachable from a "starting" vertex 'S' within a certain number of hops:

```
bool bidirectional_s_t_connectivity (vertex S, vertex T, int hops) {
    if (S = = T)
        return true;
    Set FW = {S};
    Set REV = {T};
    while (hops > 0) {
        // check forward
        hops--;
        FW = FW ∪ {outgoing neighbors of vertices in FW}
        if (FW ∩ REV ≠ ∅) return true;
        if (hops == 0) return false;
        // check reverse
        hops--;
        REV = REV ∪ {incoming neighbors of vertices in REV}
        if (FW ∩ REV ≠ ∅) return true;
    }
    return false;
}
```

Specifically, this example bidirectional search algorithm maintains both a set of forward-reachable vertices (FW) from starting vertex 'S', and a set of reverse-reachable vertices (REV) from terminating vertex 'T', and grows each set in each iteration. The bidirectional search algorithm finds vertices 'S' and 'T' to have a close relationship (i.e., 'T' is reachable from 'S' within the given number of hops) if set FW and set REV intersect within the given number of hops.

Even though this example search algorithm shows very good asymptotic behavior, low-latency applications utilizing such a bidirectional search algorithm for connectivity searches within large graphs often fail to find an answer quickly enough to satisfy the requirements of low-latency applications. To illustrate, the example financial fraud detection application discussed above is required to determine connectivity between a pair of entities within 30 ms from the start of the transaction in question, during which time the application is able to cancel a suspicious transaction prior to completion of the transaction. This time frame is not enough time to complete a connectivity search within a very large graph, which are common in real-world applications, using the common-sense algorithm above.

There are multiple aspects of the bidirectional search algorithm that prevent attaining sufficient speed for purposes of low-latency applications. For example, set data structures that are required for the example algorithm are expensive data structures. With typical implementations of the bidirectional search algorithm, as the number of entries grow in the set data structures, the algorithm performs less efficiently. Indeed, when vertices in a subject graph are associated with millions of edges, as may occur in very large graphs, the number of entries in the sets required by the example algorithm can grow very large very quickly. Specifically, if a high-degree vertex exists near one of the vertices involved in a connectivity search, the frontier set that incorporates the neighbors of the nearby high-degree vertex immediately becomes unmanageably large.

A bidirectional search algorithm may use a bitmap implementation rather than a set data structure implementation, which leverages the fact that bitmaps are less expensive data structures to access and update than set data structures. However, even a bitmap-based implementation of a bidirectional search algorithm would not increase the efficiency of the algorithm sufficiently for the requirements of low-latency applications that utilize large graph data representations, given that the relatively expensive operation of initializing the needed bitmaps to represent large graphs would slow the search algorithm beyond what is acceptable for such applications.

Given the low-latency applications that benefit from connectivity searches over large graph data representations, it would be beneficial to quickly (e.g., in real-time or near real-time) determine vertex connectivity within large graphs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 3A-B depict example sets of landmark connectivity data.

FIG. 4 depicts a flowchart for running a vertex connectivity search on a graph data representation using landmark connectivity data.

DETAILED DESCRIPTION

Figure 1:
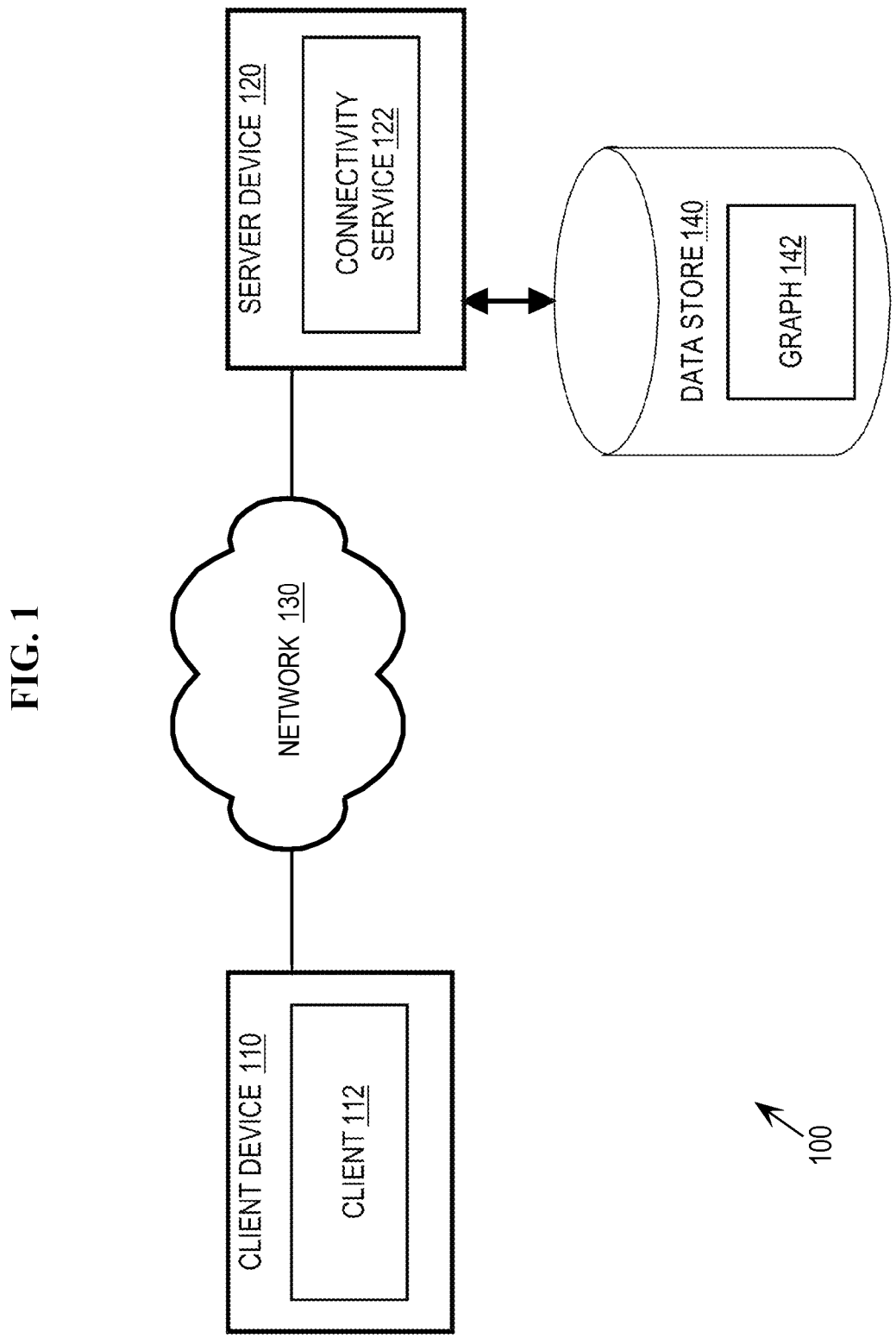
FIG. 1 is a block diagram that depicts an example network arrangement for performing real-time connectivity searches between vertices of a large graph data representation.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments perform real-time vertex connectivity checks in large graph data representations by minimizing the amount of time it takes to explore paths through high-degree vertices (referred to herein as "landmarks") that tend to be present in very large graphs. Specifically, large graph data representations are very dense (i.e., they involve a large number of edges) near the high-degree vertices, and, as such, many vertices in a large graph are connected through these high-degree vertices. Because of the large number of edges associated with a high-degree vertex, exploring paths through a high-degree vertex tends to be much more expensive than exploring paths through lower-degree vertices (referred to herein as "non-landmarks"). Furthermore, even when a pair of vertices are not connected via one or more high-degree vertices, the presence of one or more high-degree vertices close to either of the pair of vertices greatly increases the amount of time needed for search algorithms to search for connectivity of the vertices because the high-degree vertices represent a large number of paths by which the subject vertices may be reached.

Exploring paths, in a graph, that involve landmarks generally represents a large percentage of the total processing time required by connectivity search algorithms, such as bidirectional search. Thus, to greatly improve the efficiency of connectivity searching, embodiments replace the costly step of dynamically exploring paths involving landmarks with performance of a very fast first phase of connectivity search using landmark connectivity data that is generated during a preprocessing phase. Landmark connectivity data maps the connectivity of a set of identified landmarks in a graph to the other vertices in the graph.

This first search phase is extremely fast (especially compared to the time required for a search algorithm to dynamically explore paths in a graph that involve landmarks) because the landmark connectivity data is represented using bitmaps, and the search phase that involves the landmark connectivity data requires identifying pertinent portions of the bitmaps and performing a very efficient bitwise AND over the identified bitmap portions. Given that many vertices in a large graph data representation are closely connected to landmarks, and/or are related to each other via paths that involve one or more landmarks, many connectivity searches over vertices that are, in fact, closely related will be answered during this first highly-efficient search phase.

In cases where the first search phase fails to find that the vertices in question are closely related via one or more landmarks, then one or more further search phases are performed to explore paths through the graph that do not involve any landmarks. Embodiments omit, from the further search phases, exploration of any path that involves a landmark, which greatly reduces the number of paths that must be explored in these search phases.

A sparsely-populated graph is much more efficiently searched using a brute-force method (i.e., that does not involve costly set data objects, thereby allowing a measure of revisitation of vertices during the search) than set-based search algorithms, such as bidirectional search. Further, the set of non-landmark vertices in a large graph may be sufficiently sparsely-populated to make brute-force search an efficient method of searching for vertex connectivity among the non-landmark vertices. Thus, upon determining that the subject vertices are not closely related via one or more landmarks during the first search phase, embodiments move on to a second search phase that performs a brute-force search for connectivity, between the subject vertices, among the non-landmark vertices in the graph. This brute-force search bypasses exploration of any path that involves a landmark given that all such paths were already eliminated from consideration based on the results of the first search phase. According to an embodiment, the brute-force search also prevents exploration of cyclical paths by recording the vertices on a currently-explored path within a stack data structure.

According to an embodiment, the second search phase is automatically aborted upon detecting that the non-landmark vertices in the subject graph are over a threshold density. In this case, embodiments perform a third search phase involving either a modified breadth-first search or a modified bidirectional search. These searches are modified to omit, from exploration, any path that involves a high-degree vertex, thereby greatly decreasing the number of paths that must be explored by these algorithms.

Compared to existing graph solutions, embodiments reduce the amount of time required to run a connectivity search from full seconds to only milliseconds (for example, in one use-case, the time required to run a connectivity search was reduced from 12 s to around 100 ms). As such, embodiments make it possible to perform connectivity searches over large graphs in real-time, i.e., within a very small window of time during which an application may utilize the connectivity information in a real-world situation.

Graphs with High-Degree Vertices

Embodiments perform multi-phase connectivity searches to efficiently identify close connections between vertices in large graph data representations, which include one or more high-degree vertices. Specifically, many graphs, especially graphs that represent very large data sets (i.e., "big data"), include one or more vertices with a high degree of connectivity (i.e., with a dense set of incoming/outgoing edges). According to embodiments, metadata of a graph includes the degree of connectivity of the vertices in the graph.

According to one embodiment, connectivity service 122 (FIG. 1) preprocesses a graph, such as graph 142 in data store 140 (FIG. 1), which does not initially include metadata indicating degrees of connectivity, to add metadata indicating the respective degree of connectivity of each vertex in the graph. For example, FIG. 2 depicts vertices and edges in example graph 142. In FIG. 2, graph 142 includes vertices 202-226, which are connected by bidirectional edges, unless indicated otherwise (such as the edge between vertex 206 and vertex 212). Connectivity service 122 preprocesses graph 142, during a preprocessing phase, to associate each vertex with metadata indicating the degree of connectivity (" ") of the respective vertex. For example, vertex 206 is associated with four incoming, outgoing, and/or bidirectional edges. Thus, connectivity service 122 associates vertex 206 with metadata indicating that the degree of connectivity of vertex 202 is four (e.g., metadata attribute "DoC"=4).

Landmark Connectivity Data

According to an embodiment, during a preprocessing phase, connectivity service 122 creates landmark connectivity data for graph 142 that identifies a number of vertices in the graph that have over a threshold degree of connectivity. For example, a parameter ("W"), indicating a selected number of high-degree vertices for graph 142, is maintained by connectivity service 122. The parameter 'W' may be automatically determined by connectivity service 122, e.g., based on the particular makeup of the graph, as described in further detail below, or may be a value that is set by an administrator.

Based on the value of W, connectivity service 122 identifies a set of landmarks in the graph. For example, the parameter W maintained by connectivity service 122 for graph 142 is set to three, and, as such, connectivity service 122 identifies the three vertices in graph 142 that have the three highest degrees of connectivity among the vertices of the graph. Accordingly, connectivity service 122 identifies vertices 206, 214, and vertex 216 (each of which has "DoC"=4) as the set of landmarks for graph 142. According to an embodiment, connectivity service 122 associates metadata with each identified high-degree vertex indicating the "landmark" status of the vertex.

The landmark connectivity data generated by connectivity service 122 for graph 142 includes information indicating which vertices are either forward- or backward-reachable, from the identified landmarks in the graph, within a given number of hops. According to an embodiment, connectivity service 122 maintains a configurable parameter ('K') for each searchable graph and which represents the maximum number of hops that can be accommodated by connectivity searches over the associated graph. The value of K depends on the requirements of the application. Based on the maximum hop number for a graph, connectivity service 122 automatically generates landmark connectivity data for the graph to quickly accommodate connectivity searches within the graph involving any number of hops that is less than or equal to K.

According to an embodiment, connectivity service 122 establishes a respective bitmap storing landmark connectivity data for each hop of the K hops indicated by the configurable parameter. Each bitmap comprises an array of bits of the size W×N, where "N" is the total number of vertices in the subject graph. Because K is usually a small number, such as 2, 3, or 4, the amount of memory needed to store the landmark connectivity data is relatively small given the compact nature of bitmap data structures.

Connectivity service 122 divides the bitmaps into a set of forward-directional connectivity data, a set of backward-directional connectivity data. When K is an even number, then K/2 bitmaps are included in each data set. The bitmaps in the set representing the forward-directional connectivity data are named "FR_i", where 'i' runs from 1 to K/2. Similarly, the bitmaps in the set representing the backward-directional connectivity data are named "BR_i", where 'i' runs from 1 to K/2.

When K is an odd number, then one of the data sets includes K/2 bitmaps rounded up, and the other data set includes K/2 bitmaps rounded down. For example, the bitmaps in the set representing the forward-directional connectivity data are named "FR_i", where 'i' runs from 1 to K/2+0.5. In this example, the bitmaps in the set representing the backward-directional connectivity data are named "BR_i", where 'i' runs from 1 to K/2-0.5.

The following is an illustrative example based on graph 142 used to illustrate an embodiment of generating landmark connectivity data for the graph. In this simple example, the maximum number of hops (K) accommodated by the service is four, the number of high-degree vertices (W) selected for graph 142 is three, and the total number of vertices in graph 142 ('N') is 13. As depicted in FIGS. 3A-B, during a preprocessing phase for graph 142, connectivity service 122 creates 4 bitmaps (bitmaps 300-330) because K=4.

Bitmaps 300 and 320 represent the forward-directional connectivity data, and are named "FR_1" and "FR_2", respectively. Bitmaps 310 and 330 represent the backward-directional connectivity data, and are named "BR_1" and "BR_2", respectively. FR_1 and BR_1 indicate which vertices in graph 142 are connected to the identified landmarks by a single hop. FR_2 and BR_2 indicate which vertices in graph 142 are connected to the identified landmarks within two hops.

For ease of explanation, bitmaps 300-330 are depicted in FIG. 3 as two-dimensional arrays. However, according to embodiments, bitmaps storing landmark connectivity data may be implemented as one-dimensional arrays.

Preprocessing of a graph must only be performed once prior to initiating connectivity searches over the graph, according to embodiments. Because the preprocessing phase requires only a small amount of computation, and has small memory requirements, embodiments are useful for frequently-changing graphs. In the case of a changed graph, connectivity service 122 receives an indication that the graph has changed and, before proceeding with any further vertex connectivity searches over the changed graph data, connectivity service 122 automatically regenerates the landmark connectivity data for the graph. Once the updated landmark connectivity data is generated, connectivity service 122 continues processing further requests for connectivity searches within the changed graph.

According to an embodiment, when the number of changes in a changed graph (e.g., the total number of added, deleted, or modified vertices and edges in the graph) is below a threshold number, connectivity service 122 automatically modifies the previously-generated landmark connectivity data for the changed graph rather than generating landmark connectivity data for the changed graph from scratch.

Example Population of Bitmaps with Vertex Connectivity Data

To populate the single-hop (i=1) bitmaps 300 and 310, i.e., "FR_1" and "BR_1", connectivity service 122 determines whether each vertex, in graph 142, is either forward or backward reachable by each high-degree vertex (i.e., vertices 206, 214, and 216) within a single hop. To populate the double-hop (i=2) bitmaps 320 and 330, i.e., "FR_2" and "BR_2", connectivity service 122 determines whether each vertex, in graph 142, is either forward or backward reachable by each high-degree vertex (i.e., vertices 206, 214, and 216) within two hops.

Specifically, in the case of FR_1 (bitmap 300), using a forward breadth-first search (BFS), connectivity service 122 determines that vertices 202, 204, 206 (itself), 208, 212, 214, and 216 are reachable within a single forward hop of vertex 206. Thus, connectivity service 122 sets the bit (in column 302 storing single-hop forward connectivity data for vertex 206) that corresponds to each of the reachable vertices, respectively. Connectivity service 122 populates columns 304 and 306 to encode the single-hop forward-reachability of vertices 214 and 216, respectively, in a similar manner to the population of column 302. Given the single-direction edges connecting vertex 212 to vertices 206 and 214, vertex 212 is forward-reachable from vertex 206 and not from vertex 214. This information is encoded in the bits corresponding to vertex 212 in bitmap 300.

In the case of BR_1 (bitmap 310), using a backward BFS, connectivity service 122 determines that vertices 202, 204, 206 (itself), 208, 214, and 216 are reachable within a single backward hop of vertex 206. Thus, connectivity service 122 sets the bit (in column 312 storing single-hop backward connectivity data for vertex 206) that corresponds to each of the backward-reachable vertices, respectively. Connectivity service 122 populates columns 314 and 316 to encode the single-hop backward-reachability of vertices 214 and 216, respectively, in a similar manner to the population of column 312. Again, given the single-direction edges connecting vertex 212 to vertices 206, and 214, respectively, vertex 212 is backward-reachable from vertex 214 and not from vertex 206. This information is encoded in the bits corresponding to vertex 212 in bitmap 310.

In the case of FR_2 (bitmap 320), using a forward BFS, connectivity service 122 determines that all vertices other than 208 and 224 are reachable within two forward hops of vertex 206. Thus, connectivity service 122 sets the bit (in column 322 storing two-hop forward connectivity data for vertex 206) that corresponds to each of the reachable vertices, respectively. Connectivity service 122 populates columns 324 and 326 to encode the two-hop forward-reachability of vertices 214 and 216, respectively, in a similar manner to the population of column 322.

In the case of BR_2 (bitmap 330), using a backward BFS, connectivity service 122 determines that all vertices other than 208, 218, and 224 are reachable within two backward hops of vertex 206. Thus, connectivity service 122 sets the bit (in column 332 storing two-hop backward connectivity data for vertex 206) that corresponds to each of the reachable vertices, respectively. Connectivity service 122 populates columns 334 and 336 to encode the two-hop backward-reachability of vertices 214 and 216, respectively, in a similar manner to the population of column 332.

In the example bitmaps depicted in FIG. 3, the bitmaps include information indicating that the landmarks are reachable starting from themselves (e.g., the bits corresponding to vertex 206 in columns 302, 312, 322, and 332 are set to '1'). According to an embodiment, such information is omitted from the bitmap data structures. Furthermore, the two-hop bitmaps FR_2 and BR_2 indicate reachability of vertices within both one hop and two hops. According to an embodiment, two-hop bitmaps do not include reachability of vertices within one hop, and only include information about whether the vertices are reachable in two hops.

Automatic Identification of the Number of High-Degree Vertices for Landmark Connectivity Data According to an embodiment, instead of receiving a value for W from an administrator, connectivity service 122 automatically identifies an optimal value for W based on the subject graph during a preprocessing phase. Specifically, connectivity service 122 performs a series of tests, over data from the subject graph, involving a plurality of different W values pulled from an identified range of W values. Each test, of the series of tests, involves a set of connectivity searches that are performed using respective landmark connectivity data that is based on one of the plurality of different W values from the identified range. Further information about identifying a range of W values is provided below.

According to an embodiment, connectivity service 122 performs a baseline test to generate baseline result data by performing a set of connectivity searches within the subject graph using on baseline landmark connectivity data that is generated based on the highest W value in the identified range. The set of connectivity searches comprises a connectivity search for each of a predetermined number of randomly-selected pairs of vertices from the graph. To generate the baseline result data, connectivity service 122 gathers statistics on each of these connectivity searches and compiles the baseline result data from the statistics. For example, connectivity service 122 determines the respective runtime of each connectivity search of the set of connectivity searches performed in connection with the baseline test, and determines the baseline result data to be at least one of: the average runtime, the mean runtime, the maximum runtime, etc. This baseline result data is used to evaluate results of the other tests in the series of tests, as described in further detail below.

Once the baseline result data is established, connectivity service 122 tests one or more other W values within the selected range to identify the smallest W value that provides sufficiently similar results to the baseline result data, which is referred to herein as the "optimal" W value for the subject graph. According to an embodiment, particular result data from a particular test is "sufficiently similar" to the baseline result data when both (a) the particular result data is within a threshold percentage of the baseline result data, and (b) the particular result data satisfies a minimum performance threshold. Identification of an optimal W value for a subject graph strikes a balance between search speed and the size of landmark connectivity data that is required to be stored in memory.

According to an embodiment, connectivity service 122 performs, during the series of tests, a respective test for each of one or more W values in the range, starting from the maximum W value and moving through the range in descending order by any selected increment, until a sub-optimal W value is found. The sub-optimal W value produces result data that is at least one of: outside the threshold percentage of the baseline result data, or does not satisfy the minimum performance threshold. In this embodiment, connectivity service 122 selects, as the optimal W value, the W value that is the closest value that is higher than the sub-optimal value in the range, and which was tested to determine sufficient similarity. The identified optimal W value provides high-quality search times with landmark connectivity data that occupies a minimum amount of space.

Identifying the Range of W Values

According to an embodiment, connectivity service 122 automatically identifies a range of W values to be tested. According to an embodiment, connectivity service 122 automatically bases the range of W values on a default target memory usage for connectivity service 122 (i.e., a default target amount of memory to be occupied by the working version of the landmark connectivity data). Connectivity service 122 derives the maximum W value for the range from the target memory usage, in that the maximum W value of the range is the W value that fills, but does not exceed, the target memory usage. For example, when the default target memory usage for connectivity service 122 is 1 gigabyte (GB) of data, connectivity service 122 derives the maximum W value of 100 for the range because landmark connectivity data with a W of 100 fills, but does not exceed, a maximum of 1 GB.

According to an embodiment, the minimum W of the selected range is based on a predetermined range size, e.g., 40. According to another embodiment, connectivity service 122 automatically determines a minimum W value for the range based on a histogram of the degree distribution of the graph being analyzed. For example, connectivity service 122 determines, based on a histogram of the degree distribution of a subject graph, a minimum number of edges associated with a relatively high-degree vertex within the subject graph. Connectivity service 122 sets the minimum W value of the range of W values for the subject graph to be the number of vertices in the subject graph that are associated with that minimum number of edges derived from the histogram.

Furthermore, for optimal search times over very large graphs, it may be necessary to generate landmark connectivity data that exceeds the default target memory usage for connectivity service 122. For example, according to an embodiment, connectivity service 122 automatically requests an increased target memory usage in response to determining that baseline result data, which is generated from an initial baseline test, does not satisfy a minimum performance threshold.

To illustrate, the minimum performance threshold for graph 142 is an average runtime at or below 30 ms (e.g., set by an administrator), and the maximum W value in a first selected range of W values for graph 142 is 100. Connectivity service 122 determines that the baseline result data, from a baseline test using landmark connectivity data with the maximum W of 100, is an average runtime of 70 ms. In response to determining that this baseline result data does not satisfy the minimum performance threshold, connectivity service 122 ceases the series of tests based on the previous maximum W value and automatically requests an increase to the target memory usage from an administrator.

According to an embodiment, upon receiving authorization to increase the target memory usage to a given expanded target memory usage, connectivity service 122 derives a second maximum W value from the expanded target memory usage and initializes a second baseline test using the second maximum W value. Connectivity service 122 performs another check to determine if second baseline results from the second baseline test satisfies the minimum performance threshold, as described above.

Efficient Search for Vertex Connectivity in a Graph Data Representation

Based on the landmark connectivity data gathered during the preprocessing phase, embodiments employ strategic phases of searching that minimizes the impact of high-degree vertices on the amount of time needed to identify connectivity between vertices in a graph data representation. Specifically, according to one or more embodiments, upon receiving a request to determine whether a pair of vertices are connected within a selected number of hops in a given graph data representation, connectivity service 122 performs a first phase of search to determine whether the vertices are connected via one or more high-degree vertices in the graph using the landmark connectivity data. This first search phase is the only phase needed for the many vertex pairs that are closely connected via one or more landmarks.

If, however, connectivity service 122 finds that the pair of vertices are not connected via one or more high-degree vertices in the graph, connectivity service 122 automatically performs a second search phase involving a brute-force search for connectivity that ignores all landmarks in the graph. Specifically, the high-degree vertices of the graph may be safely ignored given that the first search phase would have identified any connection between a subject vertex pair via a high-degree vertex and, as such, any potential pathways between the pair of vertices that involves a high-degree vertex need not be explored a second time. This brute-force search, that does not involve any landmarks, is faster than a bidirectional search when the graph data representation is sparse. Because graph data representations—minus landmarks—tend to be sparse, this brute-force search is an efficient second-phase choice.

However, in the case where the non-landmark vertices in a graph data representation have a relatively high density, both of a modified bidirectional search and a modified BFS (modified to omit exploration of paths involving landmarks) are more efficient at identifying connections than a brute-force search. Thus, if, during the brute-force search, connectivity service 122 determines that the density of non-landmark vertices in the subject graph exceeds a threshold density, connectivity service 122 automatically aborts the brute-force search and initiates a third phase of search involving either a modified bidirectional search or a modified BFS over the graph data representation.

According to one or more embodiments, the following pseudocode represents the three search phases run by connectivity service 122 in response to a connectivity request, including pseudocode for an example modified bidirectional check:

```
bool fast_s_t_connectivity (vertex S, vertex T, int hops) {
    if (S == T) return true; // same vertex
    // check landmark connection
    if (connected_via_landmark (S, T, hops))
        return true;
    if (S.isLandmark || T.isLandmark)
        return false; // already know cannot reach thru Landmark
    // try brute-force exploration avoiding landmarks (assuming graph is sparse)
    ret = brute_force_explore (S, T, hops);
    if (ret == FOUND) return true;
    if (ret == NOT_FOUND) return false;
    // then ret == TOO_DENSE, i.e., graph is too dense around S or T
    // fall back to bidirectional search (but still avoid Landmarks)
    return modified_bidirection_check (S, T, hops);
}
```

```
bool modified_bidirection_check (vertex S, vertex T, int hops) {
    if (S == T)
        return true;
    Set FW = {S};
    Set REV = {T};
    while (hops > 0) {
        // check forward
        hops--;
        FW = FW ∪ {outgoing neighbors of vertices in FW
        without landmarks}
        if (FW ∩ REV ≠ ∅) return true;
        if (hops == 0) return false;
        // check reverse
        hops--;
        REV = REV ∪ {incoming neighbors of vertices in REV
        without landmarks}
        if (FW ∩ REV ≠ ∅) return true;
    }
    return false;
}
```

First Search Phase: Landmark-Based Connectivity Search

As indicated above, during a first search phase, connectivity service 122 performs a landmark-based search that quickly identifies vertex connectivity via paths that involve one or more high-degree vertices. FIG. 4 depicts a flowchart 400 for running a vertex connectivity search on a graph data representation using landmark connectivity data, according to an embodiment, At step 402 of flowchart 400, a request to determine whether a first vertex and a second vertex, of a particular graph data representation, are connected within a particular number of hops is received from a client, where the particular graph data representation includes a plurality of high-degree vertices. For example, connectivity service 122 receives, from client 112 running on client device 110, a request to determine whether vertex 204 is connected to vertex 220 in graph 142 within three hops. As explained in detail above, vertices 206, 214, and 216 have been identified as high-degree vertices given the identified W value of three for graph 142.

According to an embodiment, steps 404 and 406 are performed in response to receiving this request.

At step 404, based, at least in part, on landmark connectivity data, it is determined whether the first vertex and the second vertex are connected via one or more high-degree vertices, of the plurality of high-degree vertices, within the particular number of hops, where the landmark connectivity data comprises connectivity information for each of the plurality of high-degree vertices. For example, in response to receiving the request indicated in the example for step 402, connectivity service 122 automatically utilizes bitmaps that store landmark connectivity data generated, for graph 142, during a preprocessing step to determine whether vertex 220 is reachable starting from vertex 204 within three hops in graph 142.

Specifically, connectivity service 122 identifies, based on the number of hops indicated in the request, two bitmaps (to use for a first phase connectivity search requested by the request) comprising a first bitmap from the bitmaps containing forward-directional connectivity data (i.e., FR_i), and a second bitmap from the bitmaps containing backward-directional connectivity data (i.e., BR_i). If the number of hops in the request were even (e.g., 2), connectivity service 122 would simply divide the number of hops in half to find the appropriate 'i' value (i.e., 1) for both forward- and backward-directional connectivity data. In this way, the FR_i and BR_i that connectivity service 122 would select for a connectivity request with a selected number of hops of 2 would be FR_1 and BR_1.

In the case of the request in the above example, the number of hops is odd (i.e., 3). Thus, to select the bitmaps to use during the first search phase for the received request, connectivity service 122 divides the selected number of hops in half, and rounds down to find the 'i' value for one of the bitmaps and then uses "i+1" for the other required bitmap. For example, connectivity service 122 uses either [FR_2 and BR_1] or [FR_1 and BR_2] to perform the first search phase for the request. If the cumulative 'i' value for the two bitmaps equals the number of hops, then the information in the two bitmaps together covers the number of requested hops and no more.

Once connectivity service 122 selects the needed bitmaps (e.g., FR_2 and BR_1) for the first phase search, connectivity service 122 pulls the portion of the bitmap representing forward-directional connectivity data (FR_2, or bitmap 320 of FIG. 3) that corresponds to the starting vertex from the request (i.e., vertex 204). Connectivity service 122 also pulls the portion of the bitmap representing backward-directional connectivity data (BR_1, or bitmap 310 of FIG. 3) that corresponds to the terminating vertex from the request (i.e., vertex 220). For example, connectivity service 122 pulls the following two bitmaps portions from FR_2 and BR_1 compiled for graph 142 during the preprocessing phase, as represented in FIG. 3:

FR_2[204]: [1, 1, 1]

BR_1[220]: [0, 1, 0]

Connectivity service 122 then performs a bitwise AND operation on the two pulled bitmap portions. Each bit placement in each pulled bitmap portion corresponds to the same high-degree vertex, and indicates, in the case of FR_2, whether the respective landmark is forward-reachable by the starting vertex in two hops, and, in the case of BR_1, whether the respective landmark is backward-reachable by the terminating vertex in one hop. Thus, if the result of the bitwise AND operation is non-zero, then the starting and terminating vertices are connected via one or more landmarks. If the result of the bitwise AND operation is zero, then the starting and terminating vertices are not connected via one or more landmarks in the graph.

According to the above example, the result of the bitwise AND operation is the bitmap [0, 1, 0]. This non-zero bitmap indicates that vertex 220 is forward-reachable from vertex 204 in graph 142 within three hops, i.e., through vertex 214.

At step 408, responsive to determining that the first vertex and the second vertex are connected via the one or more high-degree vertices, it is indicated, in a response to the request, that the first and second vertices are connected. Continuing with the above example, in response to determining that vertices 204 and 220 are connected via a landmark during the first search phase, connectivity service 122 returns a response to the connectivity request indicating that vertex 220 is forward-reachable from vertex 204 in graph 142. In this case, there is no need to perform any further search phases.

The following pseudocode represents an embodiment of the first landmark-based search phase run by connectivity service 122:

```
bool connected_by_landmark(vertex S, vertex T, int k) {
    // pick up correlated bitmap
    FR_curr = FR[k/2]; // if k is odd, (k/2)+1
    BR_curr = BF[k/2]; // if k is odd, k/2
    // extract W bits
    FR_Bits = FR_curr[S]; // e.g. 111000
    BR_Bits = BR_curr[T]; // e.g. 010001
    Bits = FR_Bits & BR_Bits; // bitwise AND
    // check if two vertices are connected by any of W high-degree
    vertices
    return bits != 0;
}
```

Second Search Phase: Brute-Force Exploration of Graph Space

According to an embodiment, when the two vertices that are the subject of a connectivity request are not found to be connected via a landmark during the first search phase, connectivity service 122 automatically performs a second search phase involving a brute-force search that does not explore any path in the subject graph that involves a high-degree vertex. For example, connectivity service 122 receives a connectivity request to determine whether vertex 208 is reachable starting from vertex 204 in graph 142 within two hops.

In response to receiving the request, connectivity service 122 performs the first phase search as described above. Specifically, based on the selected number of hops (i.e., two), connectivity service 122 automatically identifies FR_1 and BR_1 as the bitmaps to use during the first search phase. Accordingly, connectivity service 122 pulls the following two bitmap portions from the landmark connectivity data (i.e., bitmaps 300 and 310 of FIG. 3) compiled for graph 142 during the preprocessing phase:

FR_1[204]: [1, 0, 0]
BR_1[208]: [0, 0, 0]

Connectivity service 122 performs a bitwise AND on the two extracted bitmap portions, which results in the bitmap [0, 0, 0]. This all-zero bitmap indicates that vertex 208 is not reachable starting from vertex 204 via high-degree vertices in graph 142 within two hops. In response to determining that the starting and terminating vertices are not connected via a landmark, connectivity service 122 automatically performs a second-phase brute-force search to determine whether vertex 208 is reachable starting from vertex 204 in graph 142 within two hops, i.e., by at least one path that does not involve a high-degree vertex.

According to an embodiment, a brute-force exploration of a graph does not use frontier sets, thereby allowing some measure of repeated visitations of the same vertex. Eliminating the use of set data structures cuts down on the memory requirement of the search algorithm, when compared to set-based search algorithms, and also cuts down on the processing time requirement of the brute-force exploration when the graph is sparse around the vertices that are the subject of the connectivity search. Sparsity of the graph around the subject vertices is likely because the vertices are not connected via landmarks within the selected number of hops, as proved by the negative result from the first search phase.

The brute-force search algorithm bypasses the exploration of paths that involve high-degree vertices. In the brute-force search pseudocode below, this is accomplished by checking whether a given vertex "w" on a path being explored is a landmark, i.e., "w.isLandmark". Bypassing exploration of paths that involve landmarks significantly reduces the exploration space, thereby increasing the efficiency of this second-phase search.

Furthermore, embodiments avoid unnecessary cyclical brute-force exploration of vertices in a path by maintaining a stack of vertices that track the current path. Specifically, during the second search phase, connectivity service 122 maintains, in a stack data structure, a record of: (a) the starting vertex (i.e., the starting vertex indicated in the connectivity request), (b) any intermediary vertices between the starting vertex and the current vertex being explored, and (c) the current vertex being explored. During brute-force exploration of a graph at a given level (i.e., exploring paths that are a particular number of hops long), connectivity service 122 automatically avoids cyclical path exploration based on the contents of the stack. Because the stack size is bound by the maximum number of hops ("K"), checking the stack for inclusion of any particular vertex in the stack record is acceptably fast given the benefits of avoiding cyclical searches. This check prevents the level-based exploration from being caught in useless cycles, which would exponentially increase the search space.

The following pseudocode represents an embodiment of a brute-force search phase run by connectivity service 122:

```
RET_T_brute_force_explore (vertex s, vertex t, int k) {
    int visit_count = 0;
    for (i = 1 .. k) {
        Stack S = {s}; //push the starting vertex onto the stack
        // explore each level i by brute-force
        ret = brute_force_explore_level (s, t, i, visit_count, S);
        // found or give up
        if (ret == FOUND || ret == TOO_DENSE) return ret;
    }
    // found or give up
    return NOT_FOUND;
}
```

In this pseudocode, "vertex s" is the starting vertex of a requested connectivity search, "vertex t" is the terminating vertex of the requested connectivity search, and "int k" is the requested number of hops indicated in the request. In the for loop section ("for (i=1 . . . k)"), the pseudocode explores each level, from 1 to 'k', to determine whether the starting vertex is connected to the terminating vertex, where the search starts with the smallest number of hops. This is advantageous because the time needed to perform a brute-force search increases exponentially as the number of hops grows. Starting with the smallest possible number of hops (i.e., 1) and going up from there allows connectivity service 122 to stop searching as soon as possible, with the least amount of processing power expended, in case there is a path between the starting vertex and the terminating vertex that has less than the indicated number of hops.

In the "for" loop, a stack is initialized and the starting vertex 's' is pushed onto the stack because vertex s is the starting point for all of the search paths that will be explored. Then the pseudocode initiates a recursive exploration of searching the current hop level 'i' by calling the procedure "brute_force_explore_level". This procedure returns one of: "FOUND", "TOO_DENSE", or "NOT_FOUND". If the procedure returns "FOUND" or "TOO_DENSE" before all of the hop levels have been explored, the procedure ceases searching the hop levels and returns the result. If the procedure searches all of the hop levels without finding a path from vertex s to vertex t, the procedure returns "NOT_FOUND".

The following pseudocode represents an embodiment of the "brute_force_explore_level" procedure run by connectivity service 122:

```
RET_T_brute_force_explore_level (vertex v, vertex T, int k,
                int& visit_count // call by reference
                Stack& S // call by reference
            ) {
    if (k > 1) {
        // the level being explored includes more than one hop
        // expand the check out to the neighbors of v
        // avoid landmarks
        // avoid cycle by checking Stack
        for (w: v.outNeighbors)(!w.isLandmark && !S.contains(w)) {
            Stack.push(w);
            ret = brute_force_explore_level(w, T, k-1, visit_count);
            if (ret == TOO_DENSE || ret = FOUND) return ret;
            Stack.pop( );
        }
    } else {
        for (w: v.outNeighbors) {
            if (w == T) return FOUND;
            visit_count ++;
            if (visit_count == THRESHOLD)
                return TOO_DENSE;
        }
    }
    return NOT_FOUND;
}
```

In this pseudocode, the "brute_force_explore_level" procedure recursively calls itself on a current vertex 'v' when 'k' represents more than one hop. Specifically, when 'k' is greater than 1, the "brute_force_explore_level" procedure does the following for each neighbor of the current vertex 'AT', when the neighbor is not a landmark and is not included in the stack:

Pushes the neighbor onto the stack;

Recursively calls the "brute_force_explore_level" procedure with the neighbor as the current vertex (and with one less hop); and Breaks out of the recursion if the result of calling "brute_force_explore_level" is either "FOUND" or "TOO_DENSE".

When 'k' equals 1, it is time to evaluate all the neighbors of the current vertex 'v' to determine whether vertex 't' is among its neighbors. If vertex T is among the neighbors of vertex 'v', then it has been determined that the terminating vertex of the connectivity request can be reached from the starting vertex within the indicated number of hops. In this case, the "brute_force_explore_level" procedure returns "FOUND".

According to an embodiment, prior to performing the brute-force based search on the graph, connectivity service 122 determines the degree of the starting vertex of the connectivity search request and the degree of the terminating vertex of the request. Based on the degree of the starting vertex and/or the degree of the terminating vertex, connectivity service 122 starts the brute-force search from the terminating vertex and performs the search using reverse edges. For example, connectivity service 122 starts the brute-force search from the terminating vertex and performs the search using reverse edges based on one of: the degree of the starting vertex is above a predetermined threshold, the degree of the terminating vertex is below a predetermined threshold, the ratio of the degree of the starting vertex to the degree of the terminating vertex is above a predetermined threshold, etc.

Third Search Phase: Using the Density of Non-Landmark Vertices to Switch to Modified Bidirectional Search or Modified Bfs The "brute_force_explore_level" procedure tracks the number of vertices that the procedure has visited while exploring paths for a given pair of vertices. Specifically, the "brute_force_explore_level" procedure increments an integer variable "visit_count" every time the procedure checks out the neighbors of a vertex (i.e., when k equals 1). If "visit_count" exceeds a predetermined threshold number of visits, the "brute_force_explore_level" procedure automatically determines that the graph being explored is too dense, even without the landmarks, to be effectively searched using the brute-force method.

According to an embodiment, when it is found that the graph being explored is too dense (even without the landmarks), connectivity service 122 automatically switches from the second search phase to a third search phase involving searching the non-landmark vertices of the subject graph using a modified bidirectional search. Connectivity service 122 aborts the second search phase when it is found that the non-landmark vertices are too dense because the brute-force method is only more efficient than the modified bidirectional search when the area being searched is sparse.

The modified bidirectional search is similar to the bidirectional search detailed above, but is modified to omit paths, from the search, that involve any landmarks. Specifically, when implementing the modified bidirectional search, connectivity service 122 does not include landmark vertices when expanding a forward or reverse frontier set. This modification of the bidirectional search algorithm significantly reduces exploration space by eliminating exploration of paths that include any high-degree vertices.

According to an embodiment, the third search phase is implemented using a modified BFS, where the modified BFS omits, from exploration, paths through the graph data representation that involve any of the plurality of high-degree vertices.

Architecture for Sparse Model Sampling

Figure 2:
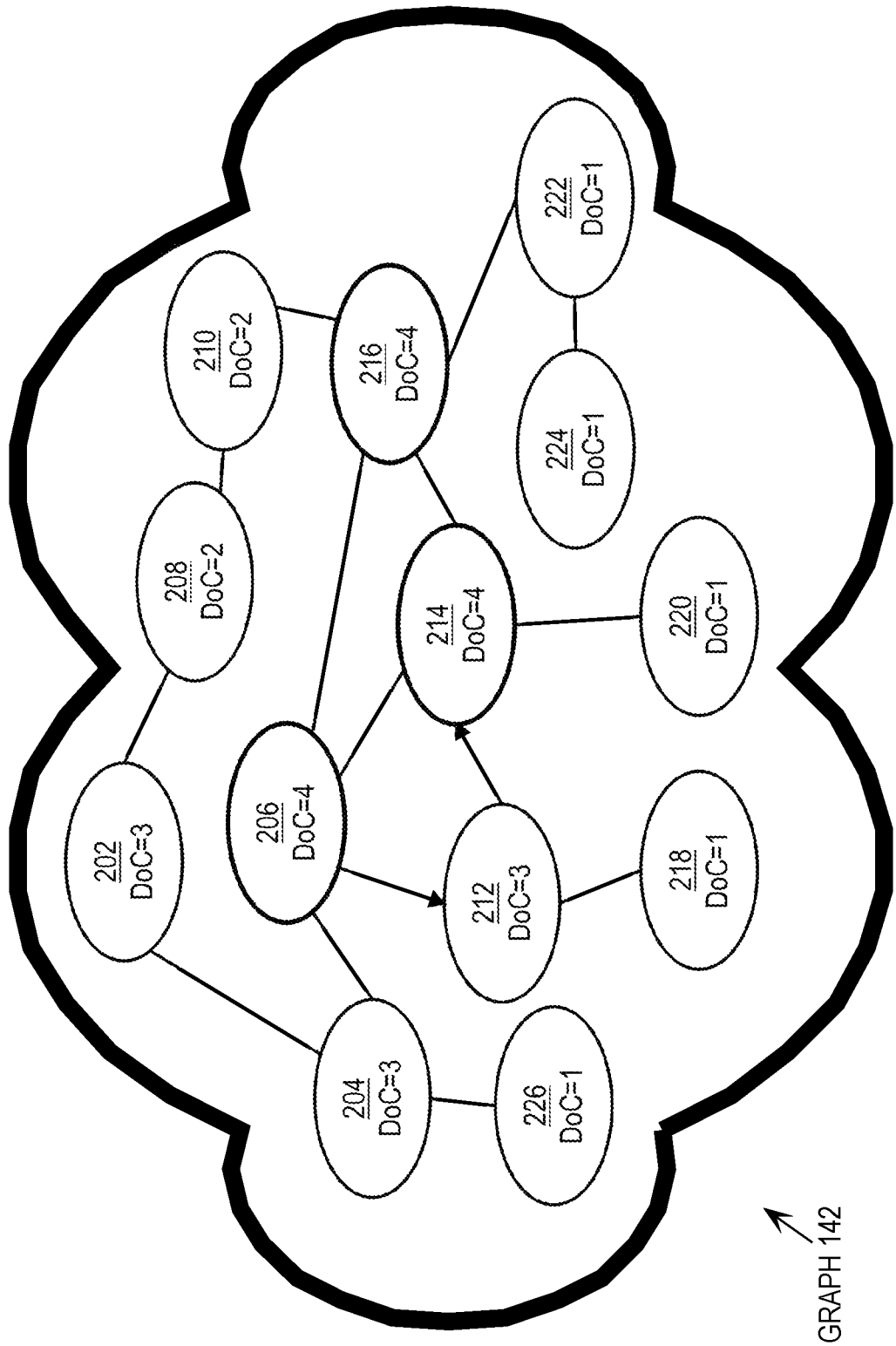
FIG. 2 depicts a non-limiting example graph data representation

FIG. 1 is a block diagram that depicts an example network arrangement 100 for performing real-time connectivity searches between vertices of a large graph data representation, according to embodiments. Network arrangement 100 includes a client device 110 and a server device 120 communicatively coupled via a network 130.

Client device 110 may be implemented by any type of computing device that is capable of communicating with server device 120 over network 130. Example implementations of client device 110 include, without limitation, workstations, personal computers, laptop computers, personal digital assistants (PDAs), tablet computers, cellular telephony devices such as smart phones, and any other type of computing device. In network arrangement 100, client device 110 is configured with a client 112. Client 112 may be implemented in any number of ways, including as a stand-alone application running on client device 110, as a plugin to a browser running at client device 110, etc. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with connectivity service 122. Any of the functionality attributed to connectivity service 122 herein may be performed by another entity running on server device 120, or by another entity on client device 110 or on other devices that are communicatively coupled to network 130, according to embodiments. Server device 120 may be configured with other mechanisms, hardware, processes, and functionalities, depending upon a particular implementation.

An application or service, such as client 110 or connectivity service 122, runs on a computing device and comprises a combination of software and allocation of resources from the computing device. Specifically, an application or service is a combination of integrated software components and an allocation of computational resources, such as memory, and/or processes on the computing device for executing the integrated software components on a processor, the combination of the software and computational resources being dedicated to performing the stated functions of the application or service.

Server device 120 is communicatively coupled to data store 140. Data store 140 maintains information for graph 142. Data store 140 may reside in any type of storage, including volatile and non-volatile storage (e.g., random access memory (RAM), a removable or disk drive, main memory, etc.), and may be implemented by one or more databases. The storage on which data store 140 resides may be external or internal to server device 120.

Client 112 and/or connectivity service 122 may send, receive, and/or respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from other entities communicatively coupled to network 130.

In an embodiment, each of the processes described in connection with client 112, and/or connectivity service 122 are performed automatically and may be implemented using one or more computer programs, other software or hardware elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
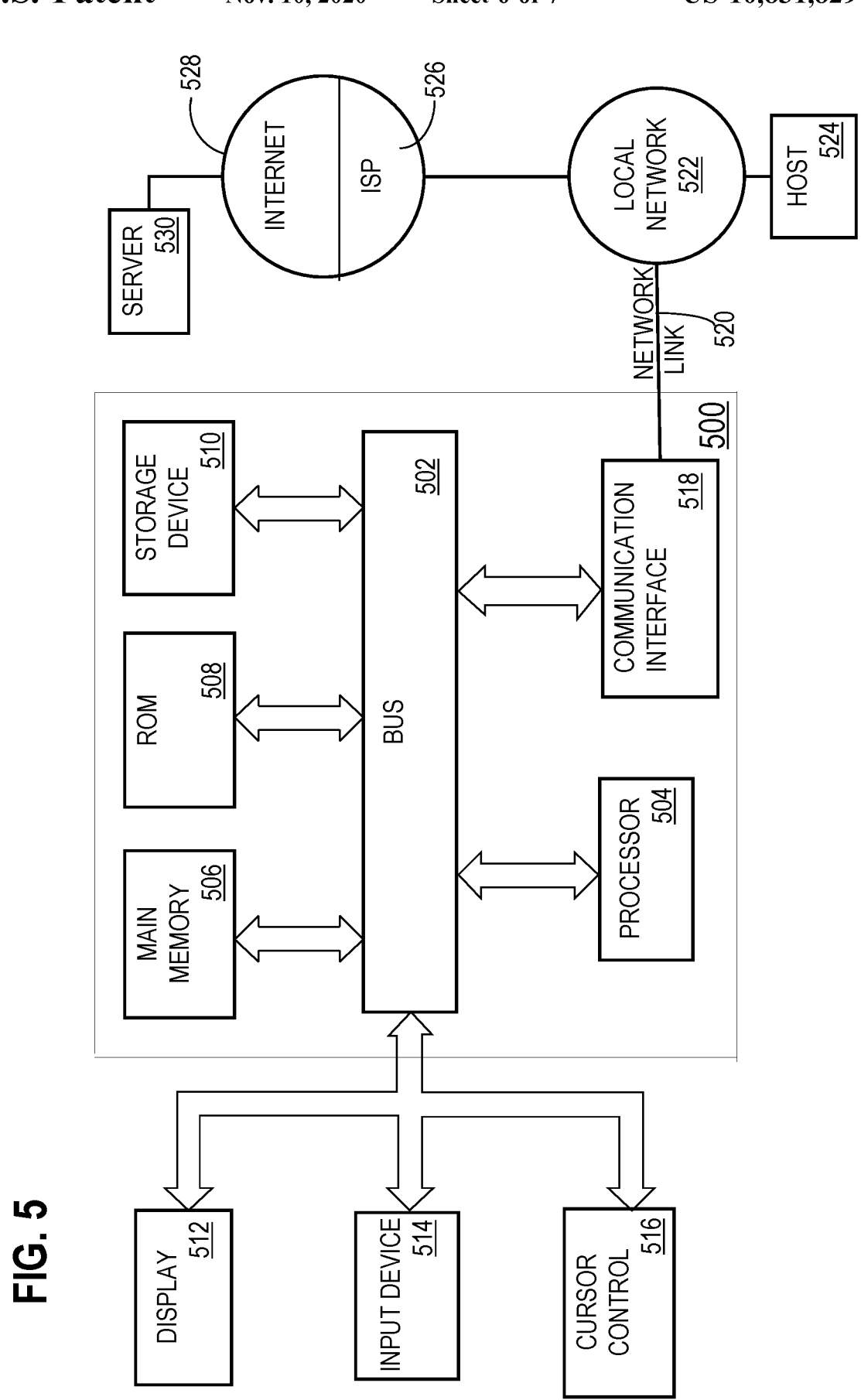
FIG. 5 depicts a computer system that may be used in an embodiment.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Software Overview

Figure 6:
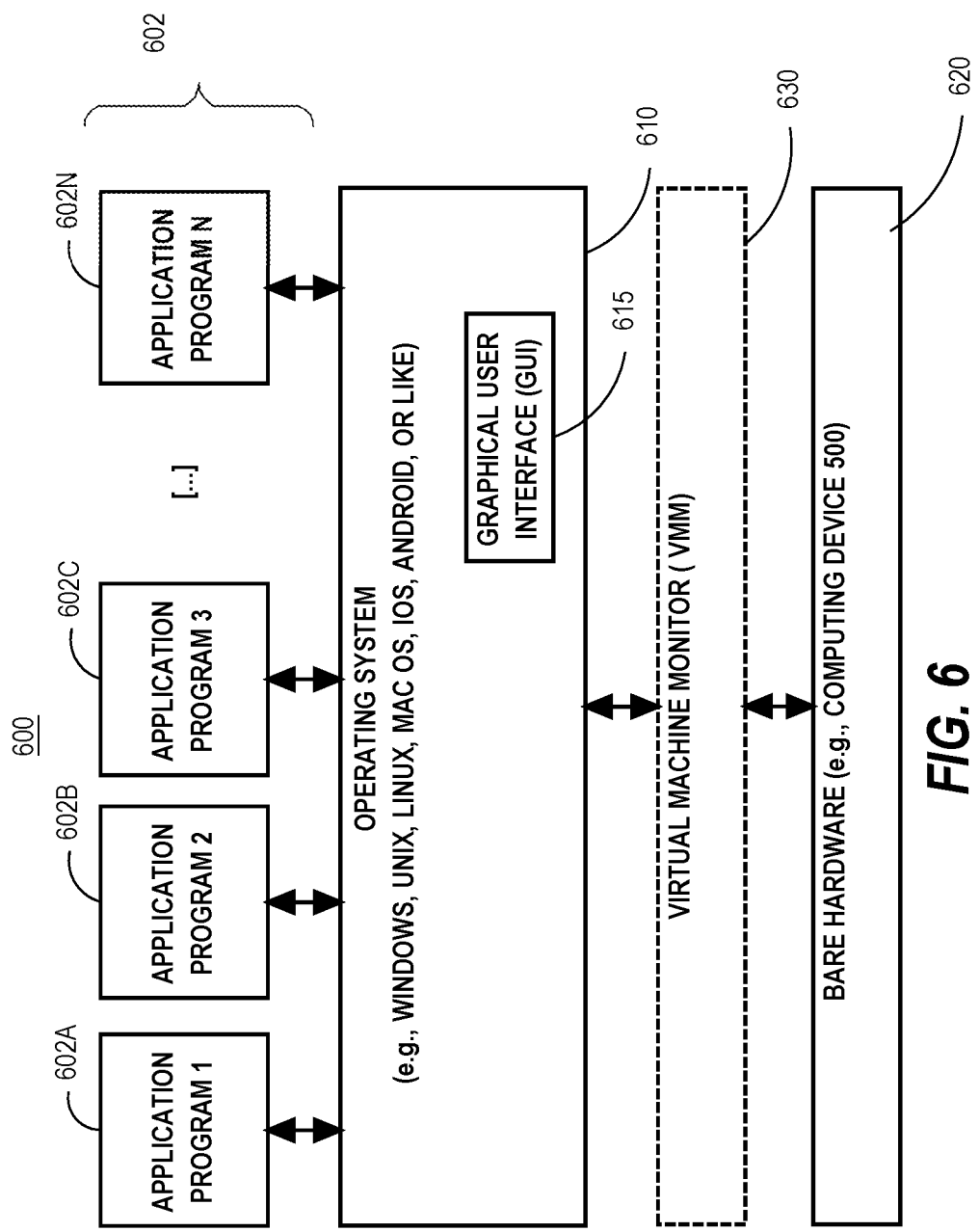
FIG. 6 depicts a software system that may be used in an embodiment.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, from a client, a request to determine whether a first vertex and a second vertex, of a particular graph data representation, are connected within a particular number of hops;
    wherein the particular graph data representation includes a plurality of high-degree vertices;
    in response to receiving the request:
        based, at least in part, on landmark connectivity data, determining whether the first vertex and the second vertex are connected via one or more high-degree vertices, of the plurality of high-degree vertices, within the particular number of hops;
        wherein the landmark connectivity data comprises connectivity information for each high-degree vertex of the plurality of high-degree vertices;
        responsive to determining that the first vertex and the second vertex are connected via the one or more high-degree vertices, indicating, in a response to the request, that the first vertex and second vertex are connected;
    wherein the method is performed by one or more computing devices.

2. The method of claim 1, further comprising:
    maintaining, in a data store, a plurality of data objects storing the landmark connectivity data;
    wherein each data object, of the plurality of data objects is associated with a respective number of hops;
    prior to determining whether the first vertex and the second vertex are connected within the particular number of hops, identifying a set of data objects, from the plurality of data objects, based on the particular number of hops; and
    wherein the landmark connectivity data, on which determining whether the first vertex and the second vertex are connected within the particular number of hops is based, is data stored in the identified set of data objects.

3. The method of claim 2, wherein:
    the identified set of data objects includes a first object containing forward-directional landmark connectivity data and a second object containing backward-directional landmark connectivity data;
determining whether the first vertex and the second vertex are connected within the particular number of hops comprises comparing a portion of the forward-directional landmark connectivity data that is associated with the first vertex to a portion of the backward-directional landmark connectivity data that is associated with the second vertex.

4. The method of claim 3, wherein:
the portion of the forward-directional landmark connectivity data is represented in a first bitmap, and the portion of the backward-directional landmark connectivity data is represented in a second bitmap;
each bit position in both the first bitmap and the second bitmap represents a particular vertex in the particular graph data representation; and
comparing the portion of the forward-directional landmark connectivity data and the portion of the backward-directional landmark connectivity data comprises performing a bitwise AND on the first and second bitmaps.

5. The method of claim 1, further comprising:
receiving, from a client, a second request to determine whether a third vertex and a fourth vertex, of the particular graph data representation, are connected within the particular number of hops;
in response to receiving the second request:
determining that the third vertex and the fourth vertex are not connected via one or more high-degree vertices, of the plurality of high-degree vertices in the particular graph data representation, based, at least in part, on the landmark connectivity data;
responsive to determining that the third vertex and the fourth vertex are not connected via one or more high-degree vertices, automatically running a brute-force exploration of non-landmark vertices in the particular graph data representation;
wherein the brute-force exploration of the non-landmark vertices omits, from exploration, paths through the particular graph data representation that involve any of the plurality of high-degree vertices.

6. The method of claim 5, further comprising:
based on the brute-force exploration of the non-landmark vertices, determining an answer as to whether the third vertex and the fourth vertex are connected in the particular graph data representation within the particular number of hops;
in response to determining the answer, indicating the answer in a response to the second request.

7. The method of claim 5, wherein:
the brute-force exploration of the non-landmark vertices explores a set of levels of connectivity, within the particular graph data representation, from one to the particular number of hops;
the method further comprises avoiding cyclical exploration of each level of connectivity, of the set of levels of connectivity, by the brute-force exploration by tracking, in a stack, vertices on a current path of exploration.

8. The method of claim 5, further comprising:
during the brute-force exploration of the non-landmark vertices, determining that a number of visited non-landmark vertices exceeds a pre-determined threshold; and
responsive to determining that the number of visited non-landmark vertices exceeds the pre-determined threshold, performing a modified bidirectional search on the non-landmark vertices;
wherein the modified bidirectional search omits, from exploration, paths through the particular graph data representation that involve any of the plurality of high-degree vertices.

9. The method of claim 5, further comprising:
during the brute-force exploration of the non-landmark vertices, determining that a number of visited non-landmark vertices exceeds a pre-determined threshold; and
responsive to determining that the number of visited non-landmark vertices exceeds the pre-determined threshold, performing a modified breadth-first search on the non-landmark vertices;
wherein the modified breadth-first search omits, from exploration, paths through the particular graph data representation that involve any of the plurality of high-degree vertices.

10. The method of claim 1, further comprising, prior to receiving the request, automatically compiling the landmark connectivity data by:
automatically identifying a range of W values, wherein a W value represents a number of high-degree vertices to identify within the particular graph data representation;
wherein automatically identifying the range of W values is based, at least in part, on a target data size for the landmark connectivity data;
compiling a first test set of landmark connectivity data based on a maximum W from the range of W values;
running a plurality of connectivity searches, based on the first test set of landmark connectivity data, by:
identifying a plurality of random pairs of vertices within the particular graph data representation,
running a connectivity search for each random pair of vertices, of the plurality of random pairs of vertices, using the first test set of landmark connectivity data, and
recording statistics of the plurality of connectivity searches;
identifying a baseline performance value for the maximum W based on the recorded statistics of the plurality of connectivity searches;
compiling second one or more sets of landmark connectivity data based on respective one or more W values from the range of W values;
running second one or more pluralities of connectivity searches, wherein each plurality of connectivity searches, of the second one or more pluralities of connectivity searches is based on a respective second set of landmark connectivity data of the second one or more sets of landmark connectivity data;
identifying second one or more performance values, for the respective one or more W values, based on respective recorded statistics for each plurality of connectivity searches of the second one or more pluralities of connectivity searches;
identifying an optimal W value that is a lowest W value, in the range of W values, associated with a second performance value that (a) satisfies a minimum performance threshold, and (b) is within a pre-determined threshold of the baseline performance value;
wherein the landmark connectivity data, on which determining whether the first vertex and the second vertex are connected is based, identifies a number of high-degree vertices equal to the optimal W value.

11. One or more non-transitory computer-readable media storing one or more sequences of instructions that, when executed by one or more processors, cause:
- receiving, from a client, a request to determine whether a first vertex and a second vertex, of a particular graph data representation, are connected within a particular number of hops;
- wherein the particular graph data representation includes a plurality of high-degree vertices;
- in response to receiving the request:
  - based, at least in part, on landmark connectivity data, determining whether the first vertex and the second vertex are connected via one or more high-degree vertices, of the plurality of high-degree vertices, within the particular number of hops;
  - wherein the landmark connectivity data comprises connectivity information for each high-degree vertex of the plurality of high-degree vertices;
  - responsive to determining that the first vertex and the second vertex are connected via the one or more high-degree vertices, indicating, in a response to the request, that the first vertex and second vertex are connected.

12. The one or more non-transitory computer-readable media of claim 11, wherein the one or more sequences of instructions further comprise instructions that, when executed by one or more processors, cause:
- maintaining, in a data store, a plurality of data objects storing the landmark connectivity data;
- wherein each data object, of the plurality of data objects, is associated with a respective number of hops;
- prior to determining whether the first vertex and the second vertex are connected within the particular number of hops, identifying a set of data objects, from the plurality of data objects, based on the particular number of hops; and
- wherein the landmark connectivity data, on which determining whether the first vertex and the second vertex are connected within the particular number of hops is based, is data stored in the identified set of data objects.

13. The one or more non-transitory computer-readable media of claim 12, wherein:
- the identified set of data objects includes a first object containing forward-directional landmark connectivity data and a second object containing backward-directional landmark connectivity data;
- determining whether the first vertex and the second vertex are connected within the particular number of hops comprises comparing a portion of the forward-directional landmark connectivity data that is associated with the first vertex to a portion of the backward-directional landmark connectivity data that is associated with the second vertex.

14. The one or more non-transitory computer-readable media of claim 13, wherein:
- the portion of the forward-directional landmark connectivity data is represented in a first bitmap, and the portion of the backward-directional landmark connectivity data is represented in a second bitmap;
- each bit position in both the first bitmap and the second bitmap represents a particular vertex in the particular graph data representation; and
- comparing the portion of the forward-directional landmark connectivity data and the portion of the backward-directional landmark connectivity data comprises performing a bitwise AND on the first and second bitmaps.

15. The one or more non-transitory computer-readable media of claim 11, wherein the one or more sequences of instructions further comprise instructions that, when executed by one or more processors, cause:
- receiving, from a client, a second request to determine whether a third vertex and a fourth vertex, of the particular graph data representation, are connected within the particular number of hops;
- in response to receiving the second request:
  - determining that the third vertex and the fourth vertex are not connected via one or more high-degree vertices, of the plurality of high-degree vertices in the particular graph data representation, based, at least in part, on the landmark connectivity data;
  - responsive to determining that the third vertex and the fourth vertex are not connected via one or more high-degree vertices, automatically running a brute-force exploration of non-landmark vertices in the particular graph data representation;
  - wherein the brute-force exploration of the non-landmark vertices omits, from exploration, paths through the particular graph data representation that involve any of the plurality of high-degree vertices.

16. The one or more non-transitory computer-readable media of claim 15, wherein the one or more sequences of instructions further comprise instructions that, when executed by one or more processors, cause:
- based on the brute-force exploration of the non-landmark vertices, determining an answer as to whether the third vertex and the fourth vertex are connected in the particular graph data representation within the particular number of hops;
- in response to determining the answer, indicating the answer in a response to the second request.

17. The one or more non-transitory computer-readable media of claim 15, wherein:
- the brute-force exploration of the non-landmark vertices explores a set of levels of connectivity, within the particular graph data representation, from one to the particular number of hops;
- the one or more sequences of instructions further comprise instructions that, when executed by one or more processors, cause avoiding cyclical exploration of each level of connectivity, of the set of levels of connectivity, by the brute-force exploration by tracking, in a stack, vertices on a current path of exploration.

18. The one or more non-transitory computer-readable media of claim 15, wherein the one or more sequences of instructions further comprise instructions that, when executed by one or more processors, cause:
- during the brute-force exploration of the non-landmark vertices, determining that a number of visited non-landmark vertices exceeds a pre-determined threshold; and
- responsive to determining that the number of visited non-landmark vertices exceeds the pre-determined threshold, performing a modified bidirectional search on the non-landmark vertices;
- wherein the modified bidirectional search omits, from exploration, paths through the particular graph data representation that involve any of the plurality of high-degree vertices.

19. The one or more non-transitory computer-readable media of claim 15, wherein the one or more sequences of instructions further comprise instructions that, when executed by one or more processors, cause:

during the brute-force exploration of the non-landmark vertices, determining that a number of visited non-landmark vertices exceeds a pre-determined threshold; and responsive to determining that the number of visited non-landmark vertices exceeds the pre-determined threshold, performing a modified breadth-first search on the non-landmark vertices;

wherein the modified breadth-first search omits, from exploration, paths through the particular graph data representation that involve any of the plurality of high-degree vertices.

20. The one or more non-transitory computer-readable media of claim 11, wherein the one or more sequences of instructions further comprise instructions that, when executed by one or more processors, cause, prior to receiving the request, automatically compiling the landmark connectivity data by:

automatically identifying a range of W values, wherein a W value represents a number of high-degree vertices to identify within the particular graph data representation;

wherein automatically identifying the range of W values is based, at least in part, on a target data size for the landmark connectivity data;

compiling a first test set of landmark connectivity data based on a maximum W from the range of W values;

running a plurality of connectivity searches, based on the first test set of landmark connectivity data, by:

identifying a plurality of random pairs of vertices within the particular graph data representation, running a connectivity search for each random pair of vertices, of the plurality of random pairs of vertices, using the first test set of landmark connectivity data, and recording statistics of the plurality of connectivity searches;

identifying a baseline performance value for the maximum W based on the recorded statistics of the plurality of connectivity searches;

compiling second one or more sets of landmark connectivity data based on respective one or more W values from the range of W values;

running second one or more pluralities of connectivity searches, wherein each plurality of connectivity searches, of the second one or more pluralities of connectivity searches, is based on a respective second set of landmark connectivity data of the second one or more sets of landmark connectivity data;

identifying second one or more performance values, for the respective one or more W values, based on respective recorded statistics for each pluralit of connectivity searches of the second one or more pluralities of connectivity searches;

identifying an optimal W value that is a lowest W value, in the range of W values, associated with a second performance value that (a) satisfies a minimum performance threshold, and (b) is within a pre-determined threshold of the baseline performance value;

wherein the landmark connectivity data, on which determining whether the first vertex and the second vertex are connected is based, identifies a number of high-degree vertices equal to the optimal W value.

* * * * *

UNITED STATES PATENT AND TRADEMARK OFFICE
CERTIFICATE OF CORRECTION

PATENT NO. : 10,831,829 B2
APPLICATION NO. : 16/185236
DATED : November 10, 2020
INVENTOR(S) : Sevenich et al.

Page 1 of 1

It is certified that error appears in the above-identified patent and that said Letters Patent is hereby corrected as shown below:

In the Specification

In Column 3, Line 8, after "representation" insert -- . --.

In Column 11, Line 31, delete "embodiment," and insert -- embodiment. --, therefor.

In Column 15, Line 33, delete "'AT'," and insert -- 'v', --, therefor.

In the Claims

In Column 22, Line 54, in Claim 2, after "objects" insert -- , --.

In Column 22, Line 55, in Claim 2, before "number" delete "respective".

In Column 25, Line 31, in Claim 12, before "number" delete "respective".

In Column 28, Line 20, in Claim 20, delete "pluralit" and insert -- plurality --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*